(12) United States Patent
Shimakura et al.

(10) Patent No.: US 11,306,398 B2
(45) Date of Patent: Apr. 19, 2022

(54) METHOD OF FORMING CIRCUIT BODY AND CIRCUIT BODY

(71) Applicant: Yazaki Corporation, Tokyo (JP)

(72) Inventors: Keita Shimakura, Susono (JP); Takuo Matsumoto, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 168 days.

(21) Appl. No.: 16/413,925

(22) Filed: May 16, 2019

(65) Prior Publication Data

US 2019/0271086 A1 Sep. 5, 2019

Related U.S. Application Data

(63) Continuation of application No. PCT/JP2017/041072, filed on Nov. 15, 2017.

(30) Foreign Application Priority Data

Nov. 18, 2016 (JP) .............................. JP2016-225112
Oct. 5, 2017 (JP) .............................. JP2017-195318

(51) Int. Cl.
*H01B 13/16* (2006.01)
*C23C 24/04* (2006.01)
(Continued)

(52) U.S. Cl.
CPC .......... *C23C 24/04* (2013.01); *B60R 16/0207* (2013.01); *H01B 13/01209* (2013.01); *H01B 13/165* (2013.01)

(58) Field of Classification Search
CPC combination set(s) only.
See application file for complete search history.

(56) References Cited

U.S. PATENT DOCUMENTS 3,075,280 A * 1/1963 Prescott ................. H05K 3/207
29/848
4,017,480 A * 4/1977 Baum ...................... B22F 3/26
428/601
(Continued)

FOREIGN PATENT DOCUMENTS

DE 10 2004 047 357 A1 4/2006
EP 1 517 597 A2 3/2005
(Continued)

OTHER PUBLICATIONS

International Preliminary Report on Patentability, including English translation of the Written Opinion, dated May 21, 2019 by the International Searching Authority in counterpart International Patent Application No. PCT/JP2017/041072. (PCT/ISA/373 & PCT/ISA/237).

(Continued)

*Primary Examiner* — William H. Mayo, III
*Assistant Examiner* — Krystal Robinson
(74) *Attorney, Agent, or Firm* — Sughrue Mion, PLLC

(57) ABSTRACT

A conductive portion of a circuit body is formed by performing spraying on a surface of a resin casing. For spraying of the conductive portion, a cold spray method in which metal powder and inert gas are sprayed to an object is used. A circuit component is mounted on the conductive portion. Each terminal portion of the conductive portion is provided with a connector for connection with an external circuit body. An insulating resin is laminated on a surface of the conductive portion. The circuit body is directly formed on the surface of the resin casing by a series of processes described above.

4 Claims, 9 Drawing Sheets

(51) Int. Cl.
*B60R 16/02* (2006.01)
*H01B 13/012* (2006.01)

(56) References Cited

U.S. PATENT DOCUMENTS

| | | | | |
|---|---|---|---|---|
| 4,377,619 A * | 3/1983 | Schonhorn | ......... | H01L 23/5329 428/333 |
| 4,448,837 A * | 5/1984 | Ikeda | ...................... | G06F 3/045 178/17 B |
| 4,496,475 A * | 1/1985 | Abrams | .................. | H01B 1/16 106/1.14 |
| 4,546,037 A * | 10/1985 | King | ...................... | H05K 3/102 428/323 |
| 4,740,657 A * | 4/1988 | Tsukagoshi | ............. | H01B 1/22 174/84 R |
| 4,793,968 A * | 12/1988 | Mosser | ..................... | B22F 7/02 106/14.12 |
| 4,927,992 A * | 5/1990 | Whitlow | ................. | B22F 12/00 219/121.65 |
| 5,087,494 A * | 2/1992 | Calhoun | ................ | H05K 3/323 428/40.1 |
| 5,145,733 A * | 9/1992 | Kadokura | .............. | C25D 13/20 428/457 |
| 5,220,488 A * | 6/1993 | Denes | ..................... | B29C 70/78 174/254 |
| 5,725,938 A * | 3/1998 | Jin | ........................ | C04B 41/009 428/210 |
| 6,042,894 A * | 3/2000 | Goto | ........................ | H01B 1/22 427/504 |
| 6,235,996 B1 * | 5/2001 | Farooq | ............. | H01L 23/49811 174/257 |
| 6,402,866 B1 * | 6/2002 | Casey | ................ | H01L 21/4867 156/233 |
| 6,630,630 B1 * | 10/2003 | Maezawa | ............ | H05K 3/4069 174/255 |
| 7,371,452 B2 * | 5/2008 | Bourdelais | ........... | G02B 6/1221 174/95 |
| 8,062,734 B2 * | 11/2011 | Kaminsky | ............. | H05K 3/107 428/188 |
| 8,975,004 B2 * | 3/2015 | Choi | .................... | C08L 101/12 430/311 |
| 10,063,040 B1 * | 8/2018 | Nagano | ................ | H05K 5/0217 |
| 2002/0102360 A1 * | 8/2002 | Subramanian | ...... | C23C 28/3455 427/419.1 |
| 2002/0182311 A1 * | 12/2002 | Leonardi | ................ | H02K 15/03 427/128 |
| 2003/0061710 A1 * | 4/2003 | Ohashi | .................... | H05K 3/10 29/846 |
| 2004/0055153 A1 | 3/2004 | Zahradnik et al. | | |
| 2005/0029666 A1 * | 2/2005 | Kurihara | ............. | H01L 24/85 257/772 |
| 2005/0053772 A1 * | 3/2005 | Aoki | ...................... | B32B 27/18 428/209 |
| 2009/0067779 A1 * | 3/2009 | Furuyama | ................ | G02B 6/43 385/14 |
| 2009/0145548 A1 * | 6/2009 | Ho | ........................ | B32B 38/145 156/277 |

FOREIGN PATENT DOCUMENTS

| | | |
|---|---|---|
| JP | 2000-244100 A | 9/2000 |
| JP | 2001-210413 A | 8/2001 |
| JP | 2011-132561 A | 7/2011 |
| JP | 2012-9499 A | 1/2012 |
| WO | 2005/053367 A2 | 6/2005 |

OTHER PUBLICATIONS

International Search Report (PCT/ISA/210) dated Dec. 19, 2017 issued by the International Searching Authority in International Application No. PCT/JP2017/041072.
Written Opinion (PCT/ISA/237) dated Dec. 19, 2017 issued by the International Searching Authority in International Application No. PCT/JP2017/041072.

\* cited by examiner

METHOD OF FORMING CIRCUIT BODY AND CIRCUIT BODY

CROSS REFERENCE TO RELATED APPLICATIONS

This application is a continuation of PCT application No. PCT/JP2017/041072, which was filed on Nov. 15, 2017 based on Japanese patent applications 2016-225112 filed on Nov. 18, 2016 and 2017-195318 filed on Oct. 5, 2017, whose contents are incorporated herein by reference. Also, all the references cited herein are incorporated as a whole.

BACKGROUND OF THE INVENTION

1. Technical Field

The present invention relates to a method of forming a circuit body and a circuit body.

2. Background Art

Automobiles are equipped with various electrical devices and wire harnesses are wired to supply power, control signals, and the likes to those devices. The wire harness includes a plurality of wires as a circuit body and connectors attached to desired locations of those wires and is wired in a three-dimensional complex space according to the structure of each part of a vehicle (see Patent Literature JP-A-2001-210413).

SUMMARY

However, in recent years, as the number of electrical devices mounted on an automobile increases, required wire harnesses also increase, and therefore the influence of a space occupied by a wire portion and the weight thereof on the entire automobile also increases. In addition, since the assembly of the wire harness is usually performed manually, the labor required for the production of an automobile will increase as the number of wire harnesses used in the automobile increases.

The invention is made in view of the circumstances described above and an object thereof is to provide a method of forming a circuit body and a circuit body capable of reducing the amount of use of wires to be wired.

Solution to Problem

In order to achieve the object described above, a method of forming a circuit body according to the invention is characterized by the following (1) and (2).

(1) A method of forming a circuit body to form a circuit body on a resin casing, in which
a conductive portion of the circuit body is formed by spraying a first layer onto a surface of the resin casing by a cold spray method in which metal powder and inert gas are sprayed onto an object and spraying a second layer onto a surface of the first layer so that a lamination density of the second layer is greater than that of the first layer.

(2) The method of forming a circuit body according to (1), in which
the conductive portion is formed on the resin casing installed in a vehicle,
an insulating resin is laminated at least on a surface of the conductive portion, and
a circuit component is mounted on the conductive portion.

According to the method of forming a circuit body of the configuration of (1), since the circuit body is directly formed on the surface of the resin casing, the amount of use of wires to be wired can be reduced.

Also, by spraying the first layer on the resin casing and further spraying the second layer having a large lamination density on the first layer, it is possible to obtain a conductive portion which is firmly adhered to the resin casing and has excellent conductivity and low resistivity.

According to the method of forming a circuit body of the configuration of (2), since the circuit body equipped with the circuit component is directly formed on the surface of the resin casing installed on a vehicle, it is possible to reduce the amount of use of wires wired to the vehicle.

Further, in order to achieve the object described above, a circuit body according to the invention is characterized by the following (3) to (8).

(3) A circuit body, including:
a resin casing; and
a conductive portion which is formed on a surface of the resin casing, in which
the conductive portion has
a first layer constituted of an aggregate of metal particles and embedded in the surface of the resin casing, and
a second layer constituted of an aggregate of metal particles and laminated on the first layer, and
a density of the second layer is greater than that of the first layer.

(4) The circuit body according to (3), in which
the conductive portion in which a particle diameter of the metal particle is 5 μm or more and 50 μm or less is formed in the resin casing mounted on a vehicle,
an insulating resin is laminated at least on the conductive portion, and
a circuit component is mounted on the conductive portion.

(5) The circuit body according to (4), including:
a terminal portion which is electrically connected to an external circuit body provided on an object to which the resin casing is assembled.

(6) The circuit body according to (4) or (5), in which
the circuit component has,
a connector unit to which a wire connected to an auxiliary device is connected, and
a control unit for controlling the auxiliary device.

(7) The circuit body according to any one of (4) to (6), further including:
a wire wired on the resin casing, in which
one end of the wire is electrically connected to the circuit component.

(8) The circuit body according to (7), in which
the wire is a signal circuit for transmitting a signal.

According to the circuit body of the configuration of (3), since the conductive portion is formed on the surface of the resin casing, it is possible to reduce the amount of use of wires to be wired.

Moreover, the conductive portion has the first layer biting into the resin casing and the second layer of which the density is larger than that of the first layer laminated on the first layer. Therefore, the resistivity can be lowered to obtain excellent conductivity and a circuit body including the conductive portion firmly adhering to the resin casing can be provided.

According to the circuit body of the configuration of (4), since the circuit body equipped with the circuit component is directly formed on the surface of the resin casing installed on the vehicle, it is possible to reduce the amount of use of wires wired to the vehicle.

According to the circuit body of the configuration of (5), for example, it is possible to connect the circuit body installed on the vehicle body and the circuit body of the resin casing only by assembling the resin casing constituting an instrument panel or the like at a predetermined position of the vehicle body.

According to the circuit body of the configuration of (6), control of the auxiliary device can be performed by connecting a wire connected to the auxiliary device to the connector unit.

According to the circuit body of the configuration of (7), circuit parts which are common regardless of the vehicle grade and options are formed by spraying and portions which require different wiring for each grade and option are formed with wires, and thus design versatility and flexibility can be maintained.

According to the circuit body of the configuration of (8), by replacing the relatively heavy wire for power supply with a sprayed circuit body, the amount of use of wires can be reduced compared to a case of the wire harnesses of the related art, and thus weight reduction and space saving can be realized.

According to the invention, since a circuit body is directly formed on a surface of a resin casing, the amount of use of wires to be wired can be reduced.

Hereinbefore, the invention is briefly described. Furthermore, the details of the invention will be further clarified by reading DESCRIPTION OF EMBODIMENTS (hereinafter referred to as "embodiments") described below with reference to the accompanying drawings.

BRIEF DESCRIPTION OF THE DRAWINGS

FIGS. 2A to 2C are a series of process diagrams illustrating a first embodiment of the method of forming a circuit body, in which FIG. 2A illustrates a conductive portion forming step and FIG. 2B illustrates a circuit component mounting step, and further FIG. 2C is an insulating resin laminating step.

FIGS. 3A to 3D are a series of process diagrams illustrating a second embodiment of the method of forming a circuit body, in which FIG. 3A illustrates a conductive portion forming step, and FIG. 3B illustrates a circuit component mounting step, and further FIG. 3C is an insulating resin laminating step, and still further FIG. 3D illustrates a wiring process.

FIGS. 9A and 9B are images illustrating the conductive portion, in which FIG. 9A is an image of a cross section of the conductive portion and FIG. 9B is an enlarged image of a boundary portion between a first layer and a second layer of the conductive portion.

DETAILED DESCRIPTION OF EMBODIMENTS

Specific embodiments of the invention are described below with reference to the drawings.

First Embodiment

First, a conductor pattern forming apparatus will be described.

Figure 1:
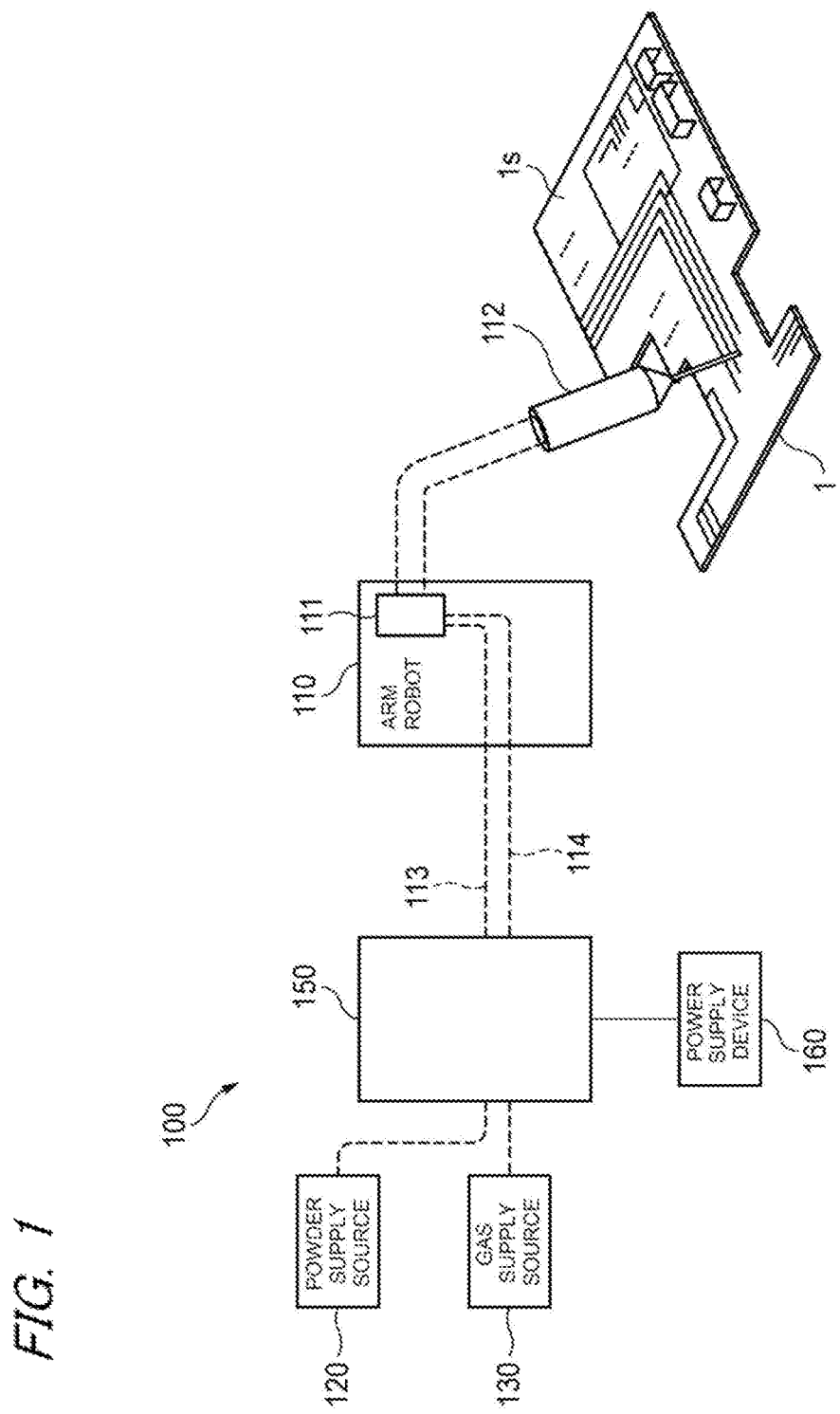
FIG. 1 is a schematic view illustrating an example of a configuration of a conductor pattern forming apparatus used in a method of forming a circuit body of the invention.

A conductor pattern forming apparatus 100 illustrated in FIG. 1 is used for manufacturing a circuit body for a vehicle of the invention. The conductor pattern forming apparatus 100 illustrated in FIG. 1 is an apparatus for forming a conductor pattern on a surface of an object by a cold spray method. The conductor pattern forming apparatus 100 includes an arm robot 110, a powder supply source 120, a gas supply source 130, a control device 150, and a power supply device 160.

A nozzle 112 is provided at a tip of an arm 111 of the arm robot 110. The nozzle 112 is freely movable in a range of a movable region of the arm 111 in a state where the nozzle 112 is held to face a surface 1s of a resin casing 1 which is a formation target object of the circuit body. A supply path 113 for supplying metal powder such as copper powder from the powder supply source 120 to the nozzle 112 and a supply path 114 for supplying inert gas (nitrogen, helium, and the like) from the gas supply source 130 to the nozzle 112 are provided within the arm robot 11. The metal powder and the inert gas are simultaneously supplied to the nozzle 112 through the respective supply paths 113 and 114.

The nozzle 112 is a so-called two-fluid nozzle having an inner and outer double structure and the metal powder ejected from an inner nozzle is accelerated by the high-speed inert gas from an outer nozzle to be ejected from the nozzle 112. The temperature of the inert gas is lower than the melting point or softening point of the metal powder and the metal powder is not melted when ejected from the nozzle 112. Therefore, the metal powder is sprayed to the resin casing 1 without producing an oxide. By laminating the metal powder, a conductive portion of the circuit body is formed on the surface 1s of the resin casing 1.

All operations of the conductor pattern forming apparatus 100, including movement of the nozzle 112 by the arm 111 of the arm robot 110, the supply of metal powder and inert gas to the nozzle 112, and the like, are executed under the control of the control device 150. The power supply to each part of the conductor pattern forming apparatus 100 at that time is conducted by the power supply device 160.

Next, a method of forming a circuit body in the present embodiment will be described with reference to the drawings.

Figure 2A:
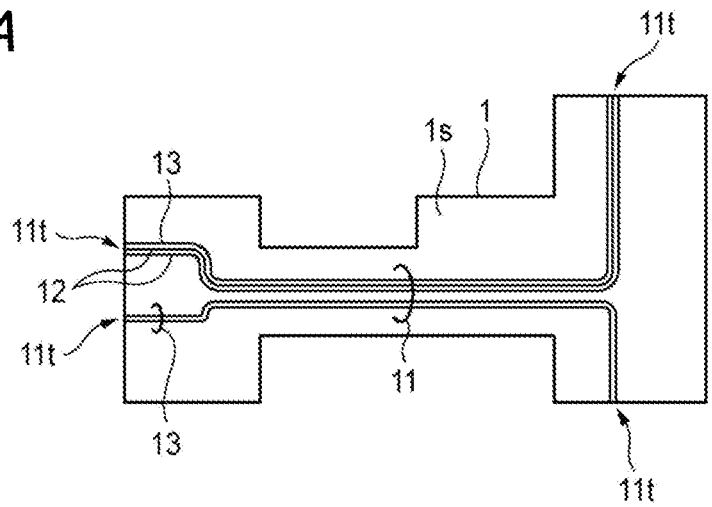

In the method of forming a circuit body according to the present embodiment, first, as illustrated in FIG. 2A, a conductive portion 11 of a circuit body 10 is formed on the surface 1s of the resin casing 1 by spraying. The resin casing 1 is a component which constitutes a part of a vehicle. For spraying of the conductive portion 11, a cold spray method in which metal powder and inert gas are sprayed to an object using the conductor pattern forming apparatus 100 illustrated in FIG. 1 is used. The particle diameter of the metal powder is 5 μm or more and 50 μm or less and spraying is performed on the resin casing 1 through a metal mask.

The conductive portion 11 includes a power supply circuit 12 and a signal circuit 13. The conductive portion 11 has a terminal portion 11t electrically connected to an external circuit body provided on an object to which the resin casing 1 is assembled.

Figure 4:
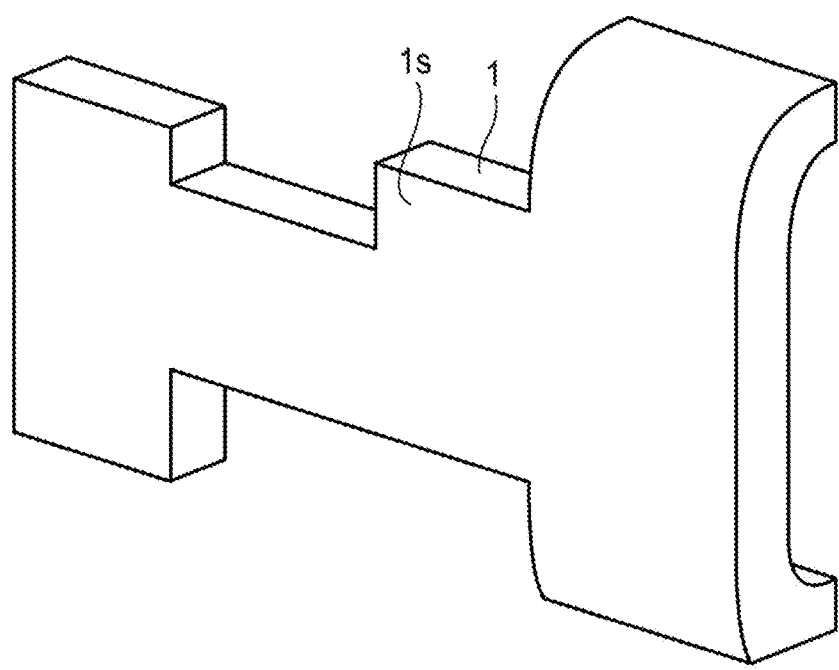
FIG. 4 is a perspective view illustrating an example of a three-dimensional structure of a resin casing installed in a vehicle.

In addition, the resin casing 1 has a three-dimensional structure. An example of the resin casing 1 includes a member having a certain degree of heat resistance, such as an instrument panel and a door trim. FIG. 4 schematically illustrates the three-dimensional structure of the resin casing 1.

Figure 2B:
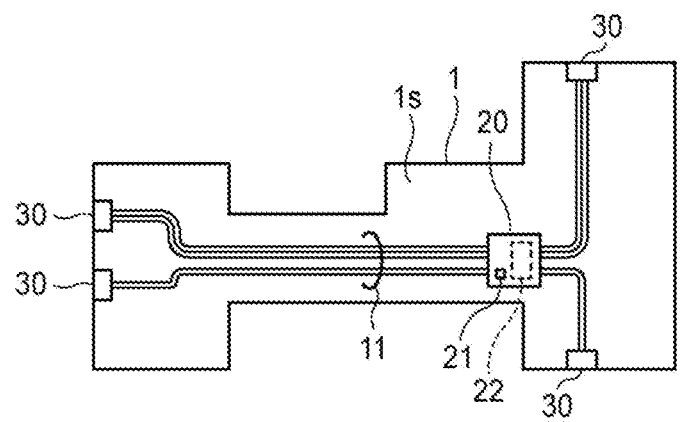

Next, as illustrated in FIG. 2B, a circuit component 20 is mounted on the conductive portion 11. Each terminal portion 11t of the conductive portion 11 is provided with a connector 30 for connecting to an external circuit body such as an electronic control unit (ECU) mounted on a vehicle. The circuit component 20 has a connector unit 21 to which a wire connected to an auxiliary device is connected and a control unit 22 which controls the auxiliary device. The circuit component 20 has a function of transmitting a signal from the ECU to a control unit in the auxiliary device or directly controlling the auxiliary device having no control unit based on the signal.

Figure 2C:
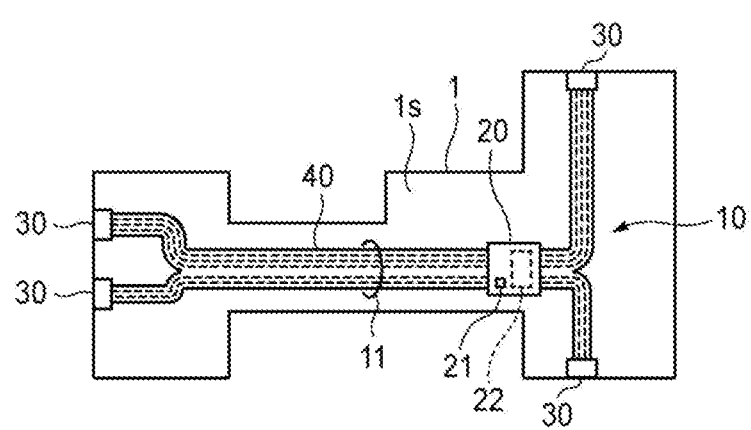

Then, as illustrated in FIG. 2C, an insulating resin 40 is laminated on a surface of the conductive portion 11 using a method such as spray coating. As the insulating resin 40, a resin such as a liquid crystal polymer which can maintain adhesion is preferable.

Figure 5:
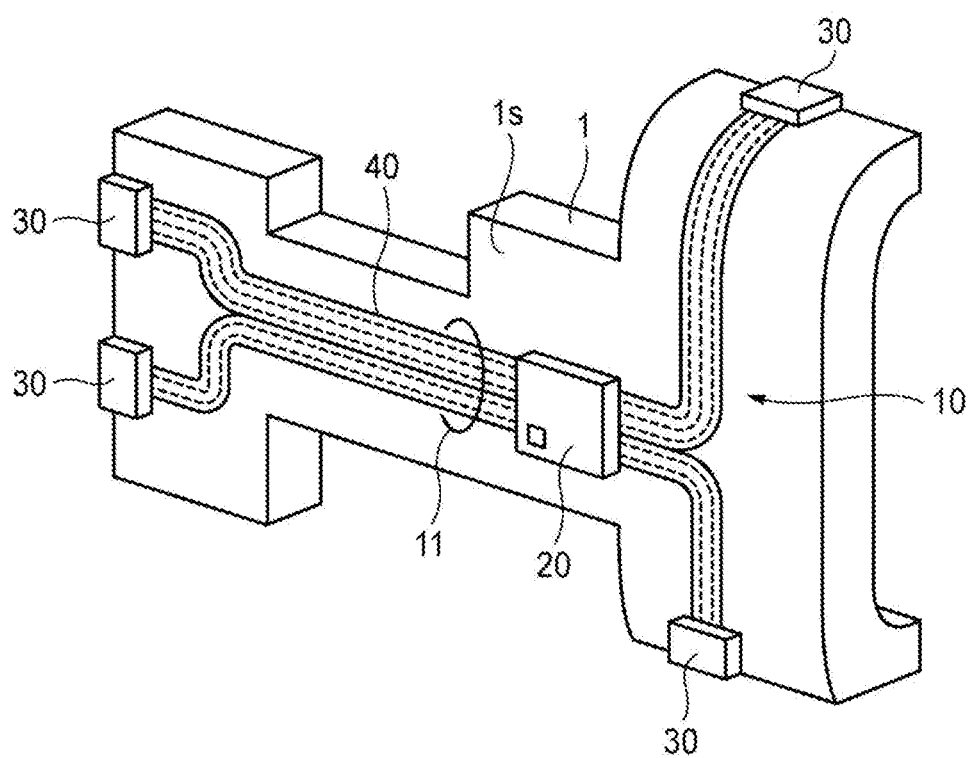
FIG. 5 is a perspective view illustrating an example of a circuit body formed on the resin casing of FIG. 4 using the method of forming a circuit body of FIGS. 2A to 2C.

By the series of processes described above, the circuit body 10 is directly formed on the surface 1s of the resin casing 1 disposed in the vehicle. FIG. 5 exemplifies the circuit body 10 formed in the resin casing 1 of the three-dimensional structure illustrated in FIG. 4.

As described above, according to the method of forming a circuit body of the first embodiment, since the circuit body 10 can be directly formed on the surface 1s of the resin casing 1 disposed in a vehicle, the amount of use of wires (wire harness) wired in the vehicle can be reduced by that amount. Therefore, it is possible to simplify the attachment workability of the electric wire to a vehicle and weight reduction and space saving can be achieved.

In addition, since the conductive portion 11 of the circuit body 10 is formed by a cold spray method, the oxidation of conductive portion 11 to be filmed can be prevented and the conductive portion 11 of a thick film of about 100 µm to 200 µm can be formed as compared with a case of using other spraying methods such as a plasma spraying method. Therefore, the electrical resistance can be reduced by increasing the dimensions of the width and thickness of the conductive portion 11.

Also, when the particle diameter of the metal powder used for spraying of the conductive portion 11 is 5 µm or more and 50 µm or less, the conductive portion 11 with low resistance which has sufficient compactness can be formed.

Second Embodiment

Next, the method of forming a circuit body in a second embodiment will be described with reference to the drawings.

Figure 3A:
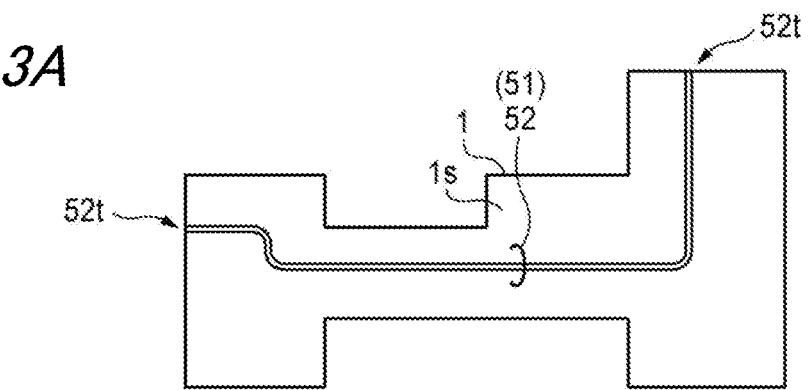

In the method of forming a circuit body according to the present embodiment, first, as illustrated in FIG. 3A, only a power supply circuit 52 in a conductive portion 51 of a circuit body 50 is formed on the surface 1s of the resin casing 1 by spraying. For spraying of the power supply circuit 52, a cold spray method using the conductor pattern forming apparatus 100 is used as in the first embodiment.

The power supply circuit 52 has a terminal portion 52t electrically connected to an external circuit body provided on an object to which the resin casing 1 is assembled.

Figure 3B:
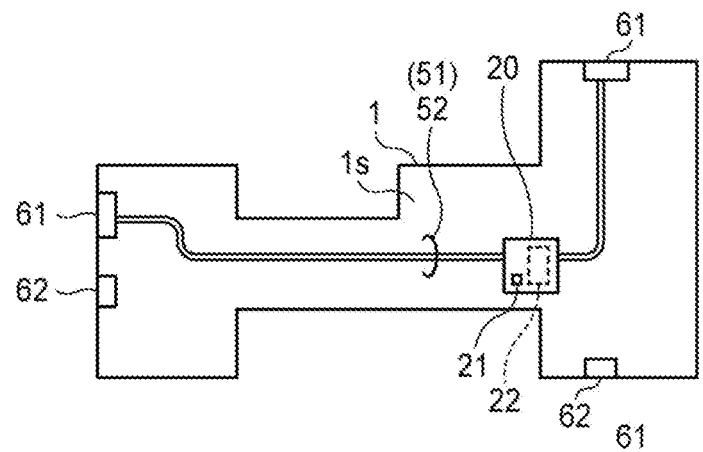

Next, as illustrated in FIG. 3B, the circuit component 20 is mounted on the power supply circuit 52. In addition, connectors 61 and 62 for connection with the external circuit body are provided at a peripheral edge portion of the resin casing 1. The connector 61 is provided at the terminal portion 52t of the power supply circuit 52.

Figure 3C:
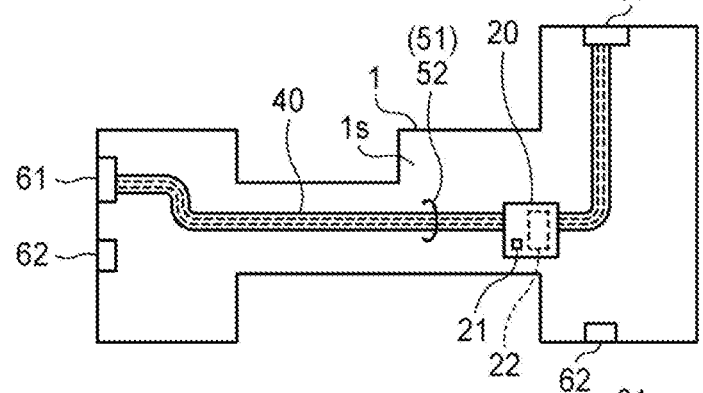

Then, the insulating resin 40 is laminated on a surface of power supply circuit 52, as illustrated in FIG. 3C.

Figure 3D:
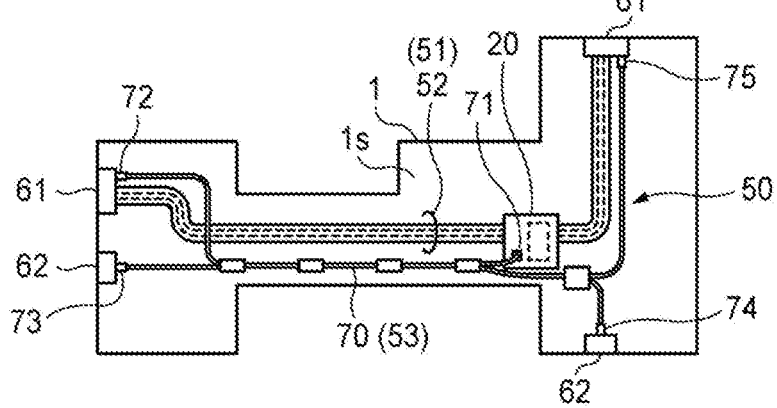

Next, as illustrated in FIG. 3D, a wire (wire harness) 70 is wired in the resin casing 1. The wire 70 constitutes a signal circuit 53 of the conductive portion 51 of the circuit body 50. The wire 70 has a plurality (five in this example) of terminals 71 to 75, in which one terminal 71 of the terminals 71 to 75 is electrically connected to the circuit component 20 and the remaining terminals 72 to 75 are electrically connected to the connectors 61 and 62.

Figure 6:
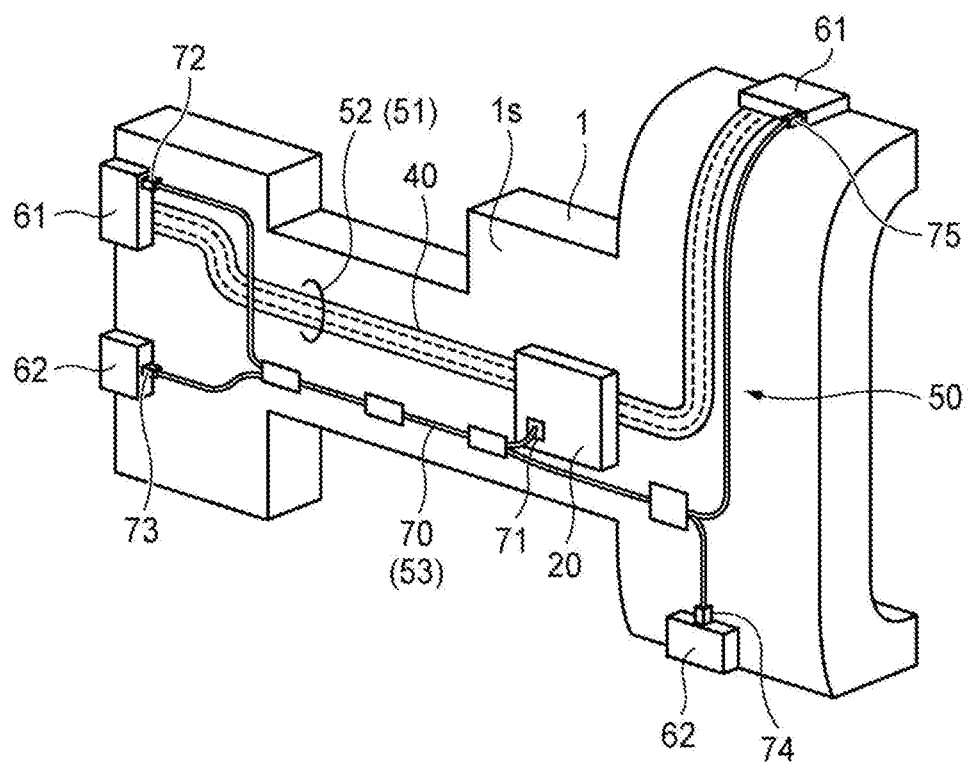
FIG. 6 is a perspective view illustrating an example of a circuit body formed on the resin casing of FIG. 4 using the method of forming a circuit body of FIGS. 3A to 3D.

By the series of processes described above, the circuit body 50 is formed on the resin casing 1 installed in a vehicle. FIG. 6 exemplifies the circuit body 50 formed in the resin casing 1 of the three-dimensional structure illustrated in FIG. 4.

As described above, according to the method of forming a circuit body of the second embodiment, the power supply circuit 52 of the circuit body 50 is directly formed on the surface 1s of the resin casing 1 disposed in the vehicle by using the cold spray method. On the other hand, the signal circuit 53 of the circuit body 50 is formed by wiring the wire 70 in the resin casing 1 as in a case of the related art.

For example, the circuit body 50 formed by such a configuration can maintain design versatility and flexibility by forming circuit portions which are common regardless of vehicle-grade and options by spraying and by forming portions which require different wiring for each grade and option by the wire.

Also, in general, a wire for power supply has a larger diameter and a heavier weight than a wire for signal. Therefore, when the wire for power supply is replaced with the power supply circuit 52 directly formed on the surface 1s of the resin casing 1 by the cold spray method, it is possible to effectively reduce the amount of use of wires to be wired in a vehicle. Therefore, the amount of use of wires in the vehicle can be reduced, and therefore the attachment workability can be simplified and the weight reduction and space saving can be achieved.

On the contrary, since the number of the wires for signal can be reduced by multiplexing, when the wire for signal is replaced with the power supply circuit directly formed on the surface of the resin casing by the cold spray method, the merit may be small compared with that in a case of the wire for power supply. However, the configuration of the circuit body can be simplified compared to the wire harness of the related art which uses both the wire for signal and the wire for power supply.

Another Embodiment

Next, another embodiment will be described.

Figure 7:
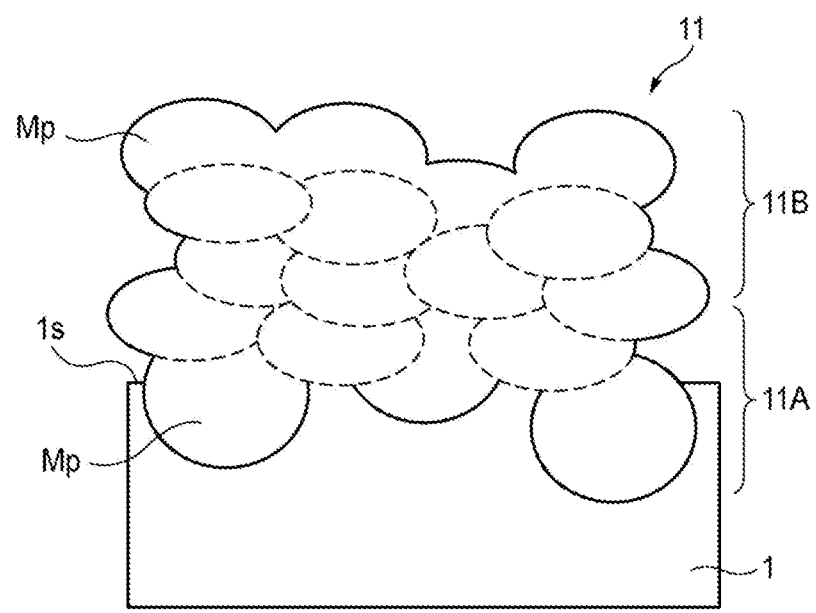
FIG. 7 is a schematic cross-sectional view of a circuit body according to another embodiment.

FIG. 7 is a schematic cross-sectional view of a circuit body according to another embodiment.

As illustrated in FIG. 7, in another embodiment, the conductive portion 11 sprayed on the surface 1s of the resin casing 1 has a first layer 11A and a second layer 11B. The first layer 11A is embedded in the surface 1s of the resin casing 1 and mainly constitutes an anchor layer. The second layer 11B is laminated on the first layer 11A, and mainly constitutes a circuit layer. The second layer 11B has a density greater than that of the first layer 11A. Each of the first layer 11A and the second layer 11B is constituted of an aggregate of metal particles Mp which are metal powder. The particle diameter of the metal particles Mp constituting those first layer 11A and second layer 11B is 5 μm or more and 50 μm or less.

According to the circuit body 10 provided with the conductive portion 11 having such first layer 11A and second layer 11B, it is possible not only to reduce the amount of use of wires to be wired, but also to lower the resistivity of the conductive portion 11 since the conductive portion 11 has the second layer 11B whose density is greater than that of the first layer 11A. As a result, it is possible to obtain excellent conductivity.

In order to form the conductive portion 11 having the first layer 11A and the second layer 11B, first, the metal particles Mp are blown against the surface 1s of the resin casing 1 as in a particle state by a cold spray method, thereby conducting spraying. In this way, the metal particles Mp are embedded in the surface 1s of the resin casing 1 to form the first layer 11A. Next, the metal particles Mp are blown against the surface of the first layer 11A by a cold spray method so that the lamination density becomes larger than that of the first layer 11A, thereby conducting spraying. As a result, the second layer 11B which is formed by attaching and laminating the metal particles Mp onto the first layer 11A. Therefore, the second layer 11B having a density greater than that of the first layer 11A is laminated on the first layer 11A embedded in the surface 1s of the resin casing 1, and therefore the conductive portion 11 having excellent conductivity with low resistivity can be obtained.

Here, the reason why the resistivity of the conductive portion 11 is lowered by forming the conductive portion 11 with the first layer 11A and the second layer 11B will be described.

Figure 8:
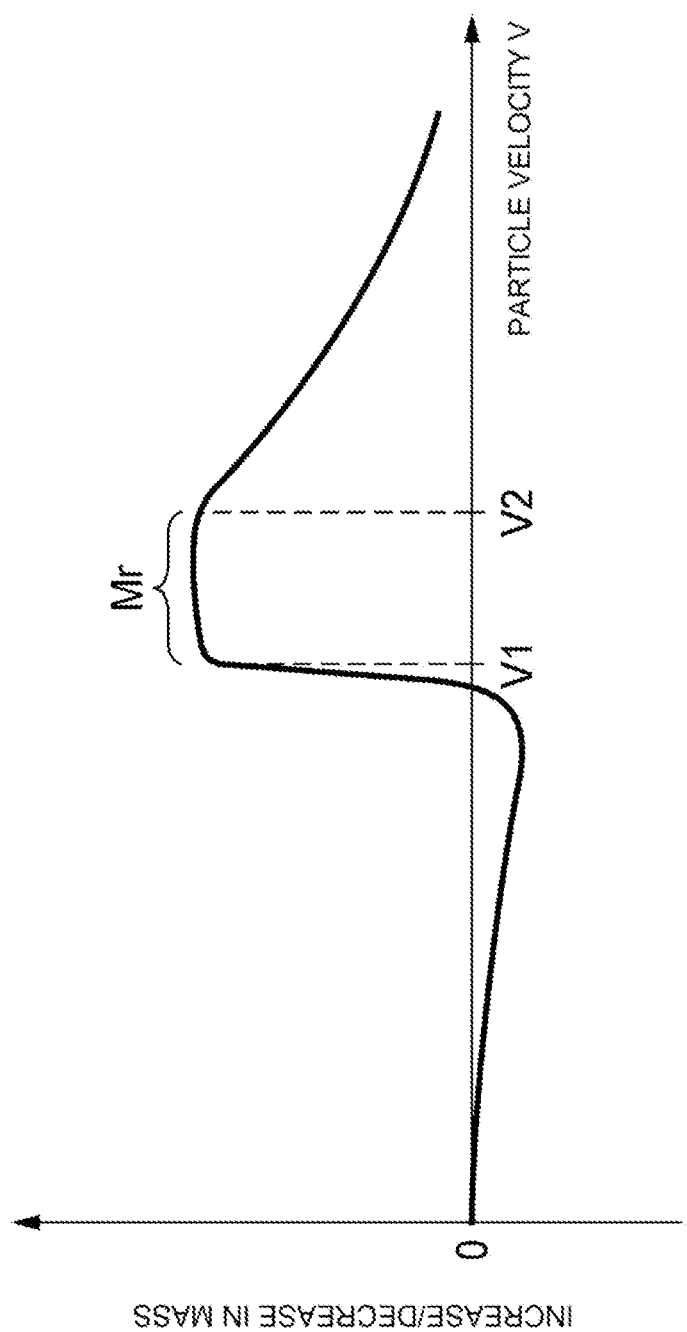
FIG. 8 is a graph illustrating mass change with respect to particle velocity during spraying of metal particles.

FIG. 8 is a graph illustrating mass change with respect to particle velocity at the time of spraying metal particles.

When the first layer 11A is formed by spraying the metal particles Mp onto the resin casing 1 by a cold spray method, as illustrated in FIG. 8, if particle velocity V is extremely slow, the metal particles Mp sprayed to the resin casing 1 rebound. Thus, the metal particles Mp are not favorably in close contact with the resin casing 1. That is, the mass does not increase because the metal particle Mp is not in close contact with the resin casing 1, and conversely, the resin casing 1 is scraped by the metal particles Mp to reduce the mass thereof.

From this state, when the particle velocity V of the metal particles Mp becomes equal to or higher than a critical velocity V1, the rebound is suppressed and the metal particles Mp adhere so as to bite into the resin casing 1, and thus the mass of the resin casing 1 increases. The density of the metal particles Mp adhered to the resin casing 1 becomes larger as the particle velocity V is higher, and thus the resistivity is lowered. However, when the particle velocity V is extremely fast, the sprayed metal particles Mp scrape the surface of the resin casing 1 and the adhered metal particles Mp, thereby reducing the mass thereof. For this reason, as the particle velocity V when spraying the first layer 11A, the velocity is set as fast as possible in consideration of conductivity within a range Mr between the critical velocity V1, at which the metal particles Mp can adhere to the resin casing 1, or more and a velocity V2, at which scraping does not occur, or less. Thus, in the first layer 11A formed in the resin casing 1, the reduction of the resistivity is limited due to the limitation of the particle velocity V of the metal particles Mp.

In a case of spraying the metal particles Mp onto the first layer 11A by a cold spray method to form the second layer 11B, the critical velocity V1 at which the metal particles Mp become in close contact with the first layer 11A without rebounding from the first layer 11A is faster than that in a case of spraying the metal particles Mp onto the resin casing 1. Similarly, the velocity V2 at which the first layer 11A is scraped by the sprayed metal particles Mp is also faster than that in a case of fusing the first layer 11A. As a result, in a case of forming the second layer 11B, the range Mr between the critical velocity V1, at which the metal particles Mp can adhere to the first layer 11A, or more and the velocity V2, at which scraping does not occur, or less becomes greater than that in a case of forming the first layer 11A.

From the above, it is possible to make the particle velocity V at the time of spraying the second layer 11B to the first layer 11A faster than the particle velocity V at the time of spraying the first layer 11A to the resin casing 1. Therefore, the second layer 11B can be sprayed at a speed higher than that of spraying the first layer 11A, and thus the density can be increased. As a result, the resistivity can be further reduced.

In addition, by forming the first layer 11A onto the resin casing 1 by a cold spray method and forming the second layer 11B having a density higher than that of the first layer 11A on the first layer 11A by a cold spray method, it is possible to obtain the conductive portion 11 which adheres firmly to the surface 1s of the resin casing 1 and has excellent conductivity with low resistivity.

Figure 9A:
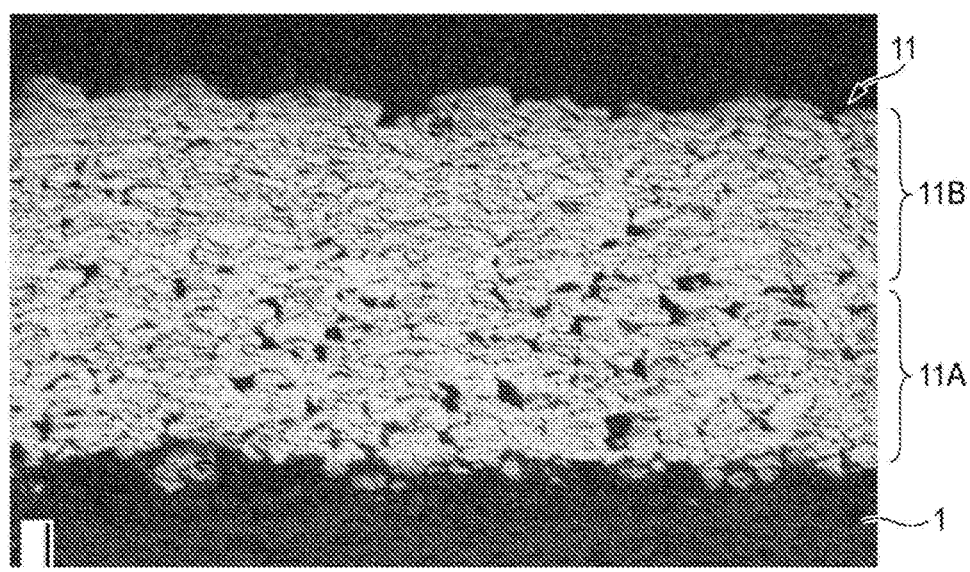
Figure 9B:
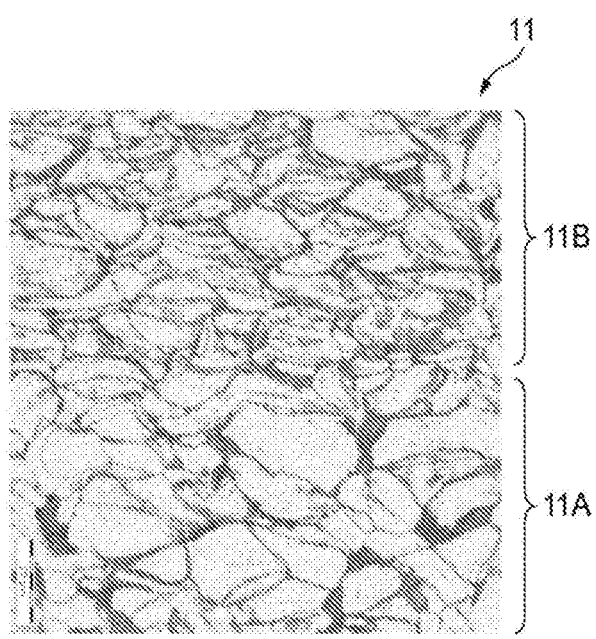

FIGS. 9A and 9B are images of the cross-section of the conductive portion 11 constituted of the first layer 11A and the second layer 11B sprayed by a cold spray method. As illustrated in FIGS. 9A and 9B, it is understood that the first layer 11A bites into the surface 1s of the resin casing 1 and the second layer 11B formed by spraying the metal particles Mp with respect to the first layer 11A at a speed higher than the particle velocity V of the metal particles Mp when forming the first layer 11A has a large density.

Other Aspects

The invention is not limited to the above-described embodiments and various modification examples can be adopted within the scope of the invention. For example, the invention is not limited to the above-described embodiments and appropriate modifications, improvements, and the likes can be made. In addition, the material, shape, size, number, arrangement location, and the like of each component in the above-described embodiments are arbitrary and not limited as long as the invention can be achieved.

As an example, in each embodiment described above, the insulating resin 40 is laminated after mounting the circuit component 20 on the conductive portion 11 or 51. However, the circuit component 20 may be mounted on the conductive portion 11 or 51 after laminating the insulating resin 40 on the surface of conductive portion 11 or 51. In this case, it is necessary to mask a location so that the insulating resin 40 is not laminated on the location where the circuit component 20 of the conductive portion 11 or 51 is mounted. However, when the insulating resin 40 is laminated by spray, it is possible to suppress the occurrence of the problem that the spray does not reach the shade of the connector or circuit component and insulating resin 40 is not laminated onto the conductive portion 11.

Here, the features of the method of forming a circuit body and the circuit body according to the embodiments of the invention described above will be briefly summarized and listed in the following [1] to [8].

[1] A method of forming a circuit body to form a circuit body (10) on a resin casing (1), in which
a conductive portion (11) of the circuit body is formed by spraying a first layer (11A) onto a surface (1s) of the resin casing by a cold spray method in which metal powder and inert gas are sprayed onto an object and by spraying a second layer (11B) onto a surface of the first layer so that a lamination density of the second layer is greater than that of the first layer.

[2] The method of forming a circuit body according to [1], in which
the conductive portion is formed on the resin casing installed in a vehicle,
an insulating resin (40) is laminated at least on a surface of the conductive portion, and
a circuit component (20) is mounted on the conductive portion.

[3] A circuit body, including:
a resin casing (1); and
a conductive portion (11) which is formed on a surface (1s) of the resin casing, in which
the conductive portion (11) has
a first layer (11A) constituted of an aggregate of metal particles and embedded in the surface of the resin casing, and
a second layer (11B) constituted of an aggregate of metal particles and laminated on the first layer, and
a density of the second layer is greater than that of the first layer.

[4] The circuit body according to [3], in which
the conductive portion in which a particle diameter of the metal particles is 5 μm or more and 50 μm or less is formed in the resin casing mounted on a vehicle,
an insulating resin (40) is laminated at least on the conductive portion, and
a circuit component (20) is mounted on the conductive portion.

[5] The circuit body according to [4], including:
a terminal portion (52t) which is electrically connected to an external circuit body provided on an object to which the resin casing is assembled.

[6] The circuit body according to [4] or [5], in which
the circuit component has,
a connector unit (21) to which a wire connected to an auxiliary device is connected, and
a control unit (22) for controlling the auxiliary device.

[7] The circuit body according to any one of [4] to [6], further including:
a wire (70) wired on the resin casing, in which
one end of the wire is electrically connected to the circuit component.

[8] The circuit body according to [7], in which
the wire is a signal circuit for transmitting a signal.

The invention is described in detail and with reference to specific embodiments. However, it will be apparent to those skilled in the art that various changes and modifications can be made without departing from the spirit and scope of the invention.

What is claimed is:

1. A circuit body, comprising:
a resin casing; and
a conductive portion which is formed on a surface of the resin casing, wherein
the conductive portion has
a first layer constituted of an aggregate of metal particles and embedded in the surface of the resin casing, and
a second layer constituted of an aggregate of metal particles and laminated on the first layer,
a density of the second layer is greater than that of the first layer, wherein
the conductive portion in which a particle diameter of the metal particles is 5 μm or more and 50 μm or less is formed in the resin casing mounted on a vehicle,
an insulating resin is laminated at least on the conductive portion, and
a circuit component is mounted on the conductive portion, wherein the circuit component has
a connector unit to which a wire connected to an auxiliary device is connected, and
a control unit for controlling the auxiliary device.

2. The circuit body according to claim 1, further comprising:
a terminal portion which is electrically connected to an external circuit body provided on an object to which the resin casing is assembled.

3. The circuit body according to claim 1, further comprising:
a wire wired on the resin casing, wherein
one end of the wire is electrically connected to the circuit component.

4. The circuit body according to claim 3, wherein
the wire is a signal circuit for transmitting a signal.

* * * * *